United States Patent [19]
Sattinger

[11] Patent Number: 5,143,790
[45] Date of Patent: Sep. 1, 1992

[54] INTEGRALLY-DAMPED STEEL COMPOSITE LAMINATED STRUCTURE AND METHOD OF ATTACHING SAME

[75] Inventor: Stanley S. Sattinger, Mt. Lebanon, Pa.

[73] Assignee: Westinghouse Electric Corp., Pittsburgh, Pa.

[21] Appl. No.: 391,804

[22] Filed: Aug. 9, 1989

[51] Int. Cl.$^5$ .............................................. B32B 15/08
[52] U.S. Cl. ..................................... 428/457; 428/461
[58] Field of Search ................. 428/461, 457, 34.1, 428/246

[56] References Cited

U.S. PATENT DOCUMENTS

| | | | |
|---|---|---|---|
| 4,599,261 | 7/1986 | Hart et al. | 428/461 X |
| 4,767,656 | 8/1988 | Chee et al. | 428/246 X |
| 4,954,375 | 9/1990 | Sattinger et al. | 428/34.1 |

Primary Examiner—Thomas J. Herbert, Jr.
Attorney, Agent, or Firm—D. Schron

[57] ABSTRACT

A laminated panel is provided by; a reinforced composite core of either an organic matrix or a metal matrix, bonded by at least one layer of adhesively bonded viscoelastic damping polymer film and face sheeting of steel for use as integrally-damped steel/composite laminates in extended ship structures, tanks, tactical mobile field units, mobile computer rooms, seismic equipment support structures or any other load-bearing steel structures utilized in high noise/high vibration environments. Utilization of an organic matrix composite core in the integrally-damped steel/composite laminate provides an effective toxicity and flammability barrier for use in human/machine interfaces. Utilization of a metal matrix composite core in the integrally-damped steel/composite laminate provides an effective flammability barrier. Internally tapered edge adapters to interconnect the laminates to themselves or to other steel structures is also provided.

25 Claims, 2 Drawing Sheets

INTEGRALLY-DAMPED STEEL COMPOSITE LAMINATED STRUCTURE AND METHOD OF ATTACHING SAME

BACKGROUND OF THE INVENTION

This invention pertains to laminated panels, and more particularly to laminated panels which provide highly predictable levels of vibration damping for dissipating vibration and noise generated by supported equipment.

There is a need for construction methods for military and commercial systems and vehicles that provide significant reductions in structural weight, but still are adequate to withstand shock and other structural loadings. Vibration and structureborne noise, for example in ship structures for stealth reasons need to be attenuated. Further, criteria on flammability and toxicity requirements, particularly in the military arena must be satisfied.

Add-on vibration damping treatments, including both free-layer and constrained-layer, are commonly used to dissipate structureborne noise in structures. Although these add-on treatments can attain high damping performance in some instances, there are disadvantages in that they add weight, create obstruction, and are vulnerable to environmental and mechanical damage. In a military application these well known methods may worsen certain hazards to combat survivability.

The problem to be solved is therefore the damping of noise and vibration in equipments, such as ships, trains and submarines wherein these systems are subjected to vibration from machinery inherent to these systems or transports.

SUMMARY OF THE INVENTION

A laminated panel having a composite core which may include fiber or particulate reinforced composites which has two faces; at least one layer of adhesively bonded viscoelastic damping polymer film, wherein the film is bonded to one of the two faces; and at least one sheet of steel which is layered upon the viscoelastic damping polymer film.

An integrally-damped steel/composite laminate of this type wherein the reinforced composite core is a metal matrix composite, the steel sheets providing a flammability barrier for the encapsulated composite core.

Further, an integrally-damped steel/composite laminate structure wherein the reinforced composite core is an organic matrix composite. The steel sheets would provide both a flammability and a toxicity barrier to the encapsulated composite core.

Internally tapered edge adapters to facilitate the mounting of the integrally-damped steel/composite laminate structure to each other or to independent metal structural members having; the laminate with end tapered reinforced composite core, a mounting structure and an adhesive or a viscoelastic damping material layer upon the taper, and a mounting means welded to the integrally-damped laminate acting to transmit the load from the integrally-damped steel/composite laminate to the mounting means is also disclosed.

BRIEF DESCRIPTION OF THE DRAWINGS

For a better understanding of the invention reference may be had to the preferred embodiment exemplary of the invention, shown in the accompanying drawings, in which.

DESCRIPTION OF THE PREFERRED EMBODIMENT

Figure 1A:
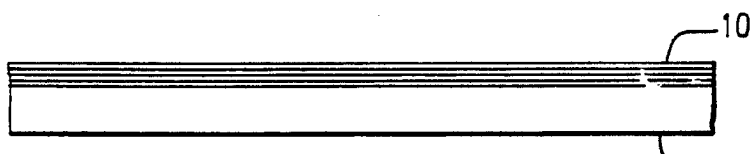
FIG. 1A is a sectional view of a schematic representation of a structural panel having free-layer

FIG. 1A is a sectional view of a schematic representation of the use of a free-layer damping treatment as well known in the prior art. Add-on vibration damping treatments, including both free-layer (FIG. 1A) and constrained-layer (FIG. 1B) are commonly used to dissipate structureborne noise in structural panels. As shown in FIG. 1A, a steel panel 5 is overlayered with viscoelastic damping tiles 10 to provide free-layer damping.

Figure 1B:
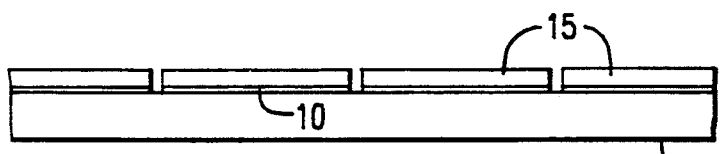
FIG. 1B is a sectional view schematic representation of a structural panel having constrained-layer damping treatment as well known in the prior art.

FIG. 1B is a sectional view of a schematic representation of the use of a constrained layer damping treatment also, well known in the prior art. In the constrained-layer damping treatment, the steel panel 5 is overlayered with viscoelastic damping tile 10 and then affixed with rigid constraining layer 15.

Although these add-on treatments as described in FIG. 1A and FIG. 1B can attain high damping performance in some instances, there are disadvantages. Both treatments add weight, create obstructions, are vulnerable to environmental and mechanical damage and may worsen certain hazards to, for example in a military application, combat survivability of human vehicle operators. Also, add-on damping treatments are often difficult to install because of limited access and visibility and because of obstructions created by stiffeners, clips, and fasteners. Conversely, add-on treatments interfere with structural access requirements after installation.

Figure 2:
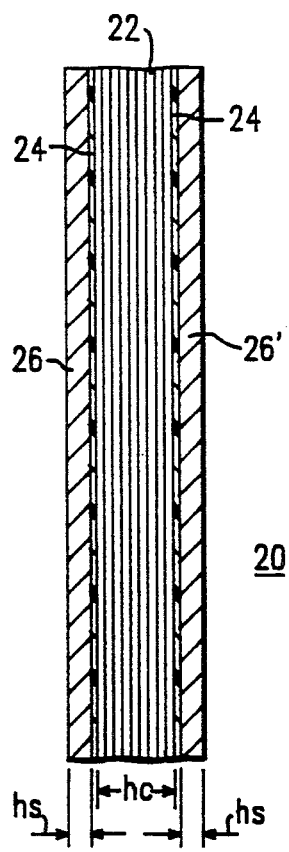
FIG. 2 is a sectional view of a schematic representation of an integrally-damped steel/composite laminate, an embodiment of the disclosed invention.

FIG. 2 is a sectional view of a schematic representation of an integrally-damped steel metal/composite laminate 20, an embodiment of the disclosed invention. This laminated structure 20 has a reinforced composite core 22 having thickness hc. This reinforced composite can be for example, fiber reinforced metal matrix such as, graphite in aluminum or magnesium or particulate reinforced metal matrix such as silicon in carbide particulate. An example of an inorganic particulate in an organic matrix would be epoxy resin filled with silica or alumina tri hydrate. The planar core 22 has two faces with viscoelastic damping polymer film 24 layered on each face. Steel face sheets such as steel sheets 26, 26' each having thickness hs, are then layered upon the viscoelastic damping polymer film 24. These laminated structures have high predicted levels of vibration damping for dissipating noise generated by, for example, supported equipment. Organic-matrix composites having high-modulus reinforcing fibers, such as epoxy matrix with glass or graphite fiber as well as metal-matrix cores having fiber or particulate reinforcement can be used in the reinforced composite core 22. Because the mass densities of composite materials can be as low as one-fifth that of steel, substantial weight reduction is anticipated for the steel/composite laminate 20 as compared to a solid steel plate.

Organic-matrix composites used in the core 22 are totally encapsulated inside a steel envelope, protecting the core 22 from damage and deterioration while also reducing flammability and lessening toxicity hazards Toxicity and flammability of shipboard materials are of major concern to the Navy. In existing add-on damping treatments, as clearly described in FIGS. 1A and 1B, especially free-layer treatments, organic damping materials are exposed directly to the ambient air over sizeable surface area. The encapsulation of damping materials with steel retards combustion by interrupting the supply of oxygen. Further, viscoelastic polymer layers 24, installed in segments having gaps between them enable vapors to be vented in a fire. Segmenting the viscoelastic polymer layer 24 would not compromise the damping function of the steel/composite laminate 20.

A steel/composite laminate 20 as shown in FIG. 2, as used for example as an extended ship structure must withstand steady-state and transient (shock) loadings, some directed transversely to the laminate 20 and some directed in the plane of the laminate 20. Another embodiment of the laminate 20 would incorporate two different viscoelastic polymer films 24, one viscoelastic polymer film 24 on each steel/composite interface 26, 26'. Use of two distinct polymer films would widen the temperature range over which high damping performance would be obtained. Specific stiffness (overall elastic modulus/overall density) and specific strength (overall ultimate strength/overall density) may be taken as important indications of merit for structural performance.

Figure 3A:
FIG. 3A is a sectional view of a schematic representation of transverse displacement on a structural member subjected to flexural waves at low frequency.

FIG. 3A is a sectional view of a schematic representation of transverse displacement (shown dotted) on a structural member subjected to flexural vibration waves at low frequency. Structureborne noise is transmitted in, for example, ship structures by flexural (bending) vibration waves in the laminate 20, at low frequencies. The flexural loss factor for the best tradeoff design of steel/composite laminate 20, results in comparable performance to add-on damping treatments without the liabilities inherent in add-on damping applications. Good extensional damping performance is also expected as a result of large differences in wavespeed between the composite core and steel face sheets.

Figure 3B:
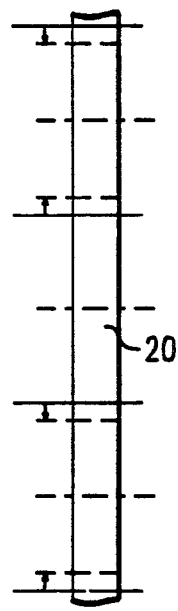
FIG. 3B is a sectional view of a schematic representation of axial or shear displacement on a structural member subjected to in-plane waves at high frequency.

FIG. 3B is a sectional view of a schematic representation of axial or shear displacement (shown dotted) on a structural member subjected to in-plane waves at high frequency. Structureborne noise is also transmitted by in-plane waves at high frequencies, resulting in axial or shear displacement. Each of these types of vibration waves are dissipated in the laminated panels 20, described in more detail in FIG. 2, through shear deformations in the layers of high-loss viscoelastic polymer film 24.

Figure 4A:
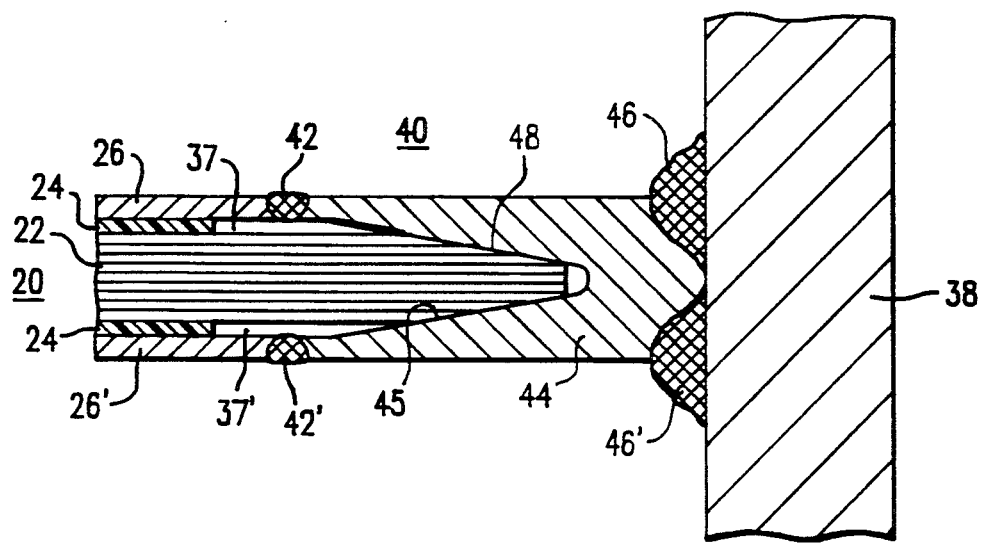
FIG. 4A is a sectional view of a schematic representation of an internally tapered edge adapter incorporating an adhesive bond.

FIG. 4A is a sectional view of a schematic representation of an internally tapered edge adapter 40 incorporating an adhesive bond 48. There must be a means of mechanically attaching the steel/composite laminated panels 20 to each other and to other structures in for example, a ship hull 38. The steel/composite laminate 20 has a reinforced composite core 22 overlayered with viscoelastic damping polymer film 24 and steel face sheets 26, 26' totally encapsulating the composite core 22. Seam welds 42, 42' encapsulate the steel/composite laminate 20 with gaps 37, 37'. The reinforced composite core 22 is tapered from the area between the seam welds 42, 42' and the strength welds 46, 46' and interfitted within a mounting means 44 having a receptacle 45. The strength welds 46, 46' attach the tapered edge adapter 40 to for example, a ship hull, another laminate panel 20, or other vibration accepting structure 38. In this embodiment of the internally tapered edge adapter 40 incorporating an adhesive bond 48, the bond 48 is layered between the interior surface of the receptacle 45 and the tapered reinforced composite core 22. This tapered edge adapter 40 transitions from the steel/composite laminate 20 to all-steel construction 38. This edge adapter performs the additional function of transferring load to the composite core 24 to establish load sharing among the core 22 and face sheets 26, 26'.

Figure 4B:
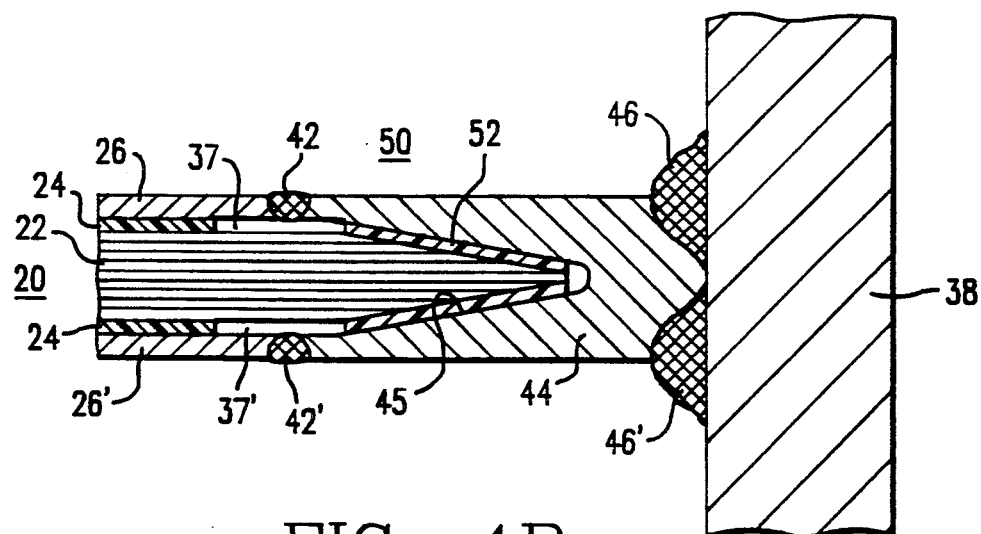
FIG. 4B is a sectional view of a schematic representation of an internally tapered edge adapter incorporating load transfer through viscoelastic damping material.

FIG. 4B is a sectional view of a schematic representation of an internally tapered edge adapter 50 incorporating load transfer through viscoelastic damping material 52 which is layered within the mounting means 44 receptacle 45. Again, as shown clearly in FIG. 4A, a steel/composite laminate 20 having a reinforced matrix core 22, viscoelastic damping polymer film 26, 26' provides structural damping. Seam welds 42, 42' encapsulate the steel/composite laminate 20 within gaps 37, 37'. The tapered composite core 24 is overlayered within the mounting means 44 receptacle 45 with additional viscoelastic damping polymer film 52.

Numerous variations may be made in the above-described combination and different embodiments of this invention may be made without departing from the spirit thereof. Therefore, it is intended that all matter contained in the foregoing description and in the accompanying drawings shall be interpreted as illustrative and not in a limiting sense.

We claim:

1. A laminated panel, comprising:
   a reinforced load bearing composite core, said reinforced load-bearing composite core having a first and a second face;
   at least one layer of adhesively bonded viscoelastic damping polymer film, said layer bonded to at least one of said faces of said reinforced composite core; and
   at least one sheet of steel, said sheet of steel layered upon said layer of adhesively bonded viscoelastic damping polymer film.

2. A laminated panel, as in claim 1, wherein said reinforced composite core is fiber reinforced.

3. A laminated panel, as in claim 1 wherein said reinforced composite core is particulate reinforced.

4. A laminated panel as in claim 1 wherein said reinforced composite core is a metal matrix composite.

5. A laminated panel as in claim 1 wherein said reinforced composite core is an organic matrix composite.

6. An integrally-damped steel/composite laminate, comprising:
   a reinforced load-bearing composite core, said reinforced composite core having a first and a second face;
   a first and a second layer of adhesively bonded viscoelastic damping polymer film, said first layer of adhesively bonded viscoelastic damping polymer film bonded to said first face of said reinforced composite core and said second layer of adhesively bonded viscoelastic damping polymer film bonded to said second face of said reinforced composite core; and a first and a second sheet of steel, said first sheet of steel bonded to said first layer of adhesively bonded viscoelastic damping polymer and said second sheet of steel bonded to said second layer of adhesively bonded viscoelastic damping polymer.

7. An integrally-damped steel/composite laminate as in claim 6 wherein said reinforced composite core is a fiber reinforced composite core.

8. An integrally-damped steel/composite laminate as in claim 6 wherein said reinforced composite core is a particulate reinforced composite core.

9. An integrally-damped steel/composite laminate, as in claim 6, wherein said reinforced composite core is a metal matrix/composite.

10. An integrally-damped steel/composite laminate, as in claim 6, wherein said reinforced composite core is an organic matrix composite.

11. A load bearing, toxicity barrier and flammability barrier laminate, comprising:
a reinforced, load-bearing organic matrix composite core, said reinforced, organic matrix composite core having a first and a second face;
at least one layer of adhesively bonded viscoelastic damping polymer film, said layer bonded to said first or said second face of said reinforced, organic matrix composite core; and
at least one sheet of steel, said sheet of steel layered upon said layer of adhesively bonded viscoelastic damping polymer film.

12. A load bearing toxicity barrier and flammability barrier laminate as in claim 11 wherein said reinforced, organic matrix composite core is fiber reinforced.

13. A load bearing, toxicity barrier and flammability barrier laminate as in claim 11 wherein said reinforced organic matrix composite core is particulate reinforced.

14. A load bearing, toxicity barrier and flammability barrier laminate as in claim 11 wherein said organic matrix composite core is a ceramic.

15. A load bearing, flammability barrier laminate, comprising:
a reinforced, metal matrix composite core, said reinforced, load-bearing metal matrix composite core having a first and a second face;
at least one layer of adhesively bonded viscoelastic damping polymer film, said layer bonded to said first or said second face of said reinforced metal matrix composite core; and
at least one sheet of steel, said sheet of steel layered upon said layer of adhesively bonded viscoelastic damping polymer film.

16. A load bearing, flammability barrier laminate, as in claim 15 wherein said reinforced metal matrix composite core is fiber reinforced.

17. A load bearing, flammability barrier laminate, as in claim 15 wherein said metal reinforced matrix composite core is particulate reinforced.

18. A load bearing, flammability barrier laminate, as in claim 15 wherein said metal matrix composite core is a metal alloy.

19. A method of forming a load-bearing, toxicity barrier and flammability barrier, integrally damped, steel/composite laminate, said method comprising the steps of:
providing a reinforced, organic matrix, composite core, said composite core having a first and a second face;
providing at least one layer of adhesively bonded viscoelastic damping polymer film, said layer bonded to said first or said second face of said composite core; and
providing at least one sheet of steel, said sheet of steel layered upon said layer of adhesively bonded viscoelastic damping polymer film.

20. Internally tapered edge adapters, comprising:
an integrally-damped laminate, said laminate having a reinforced composite core tapered on at least one end, at least one layer of adhesively bonded viscoelastic damping polymer film, and at least one sheet of steel layered upon said layer of adhesively bonded viscoelastic damping polymer film;
a mounting means, said mounting means seam welded to said integrally-damped laminate, said mounting means having a first and a second end, said first end of said mounting means having a receptacle, said receptacle operable to interfit said taper of said reinforced composite core, and said second end of said mounting means operable to be strength welded to a metal surface; and
an adhesive bond, said adhesive bond layered upon said taper of said reinforced composite core.

21. Internally tapered edge adapters as in claim 20 wherein said reinforced composite core is fiber reinforced.

22. Internally tapered edge adapters as in claim 20 wherein said reinforced composite core is particulate reinforced.

23. Internally tapered edge adapters, comprising:
an integrally-damped laminate, said laminate having a reinforced composite core tapered on at least one end, at least one layer of adhesively bonded viscoelastic damping polymer film, and at least one sheet of steel layered upon said layer of adhesively bonded viscoelastic damping polymer film:
a mounting means, said mounting means seam welded to said integrally-damped laminate, said mounting means having a first and a second end, said first end of said mounting means having a receptacle, said receptacle operable to interfit said taper of said reinforced composite core, and said second end of said mounting means operable to be strength welded to a metal surface; and
a viscoelastic damping material layered upon said taper of said reinforced composite core.

24. Internally tapered edge adapters as in claim 23 wherein said reinforced composite core is a fiber reinforced core.

25. Internally tapered edge adapters as in claim 23 wherein said reinforced composite core is a particulate reinforced core.

* * * * *